Aug. 2, 1949.  W. P. STEPHENS  2,478,135
LOCOMOTIVE LOAD CONTROL
Filed Nov. 8, 1946
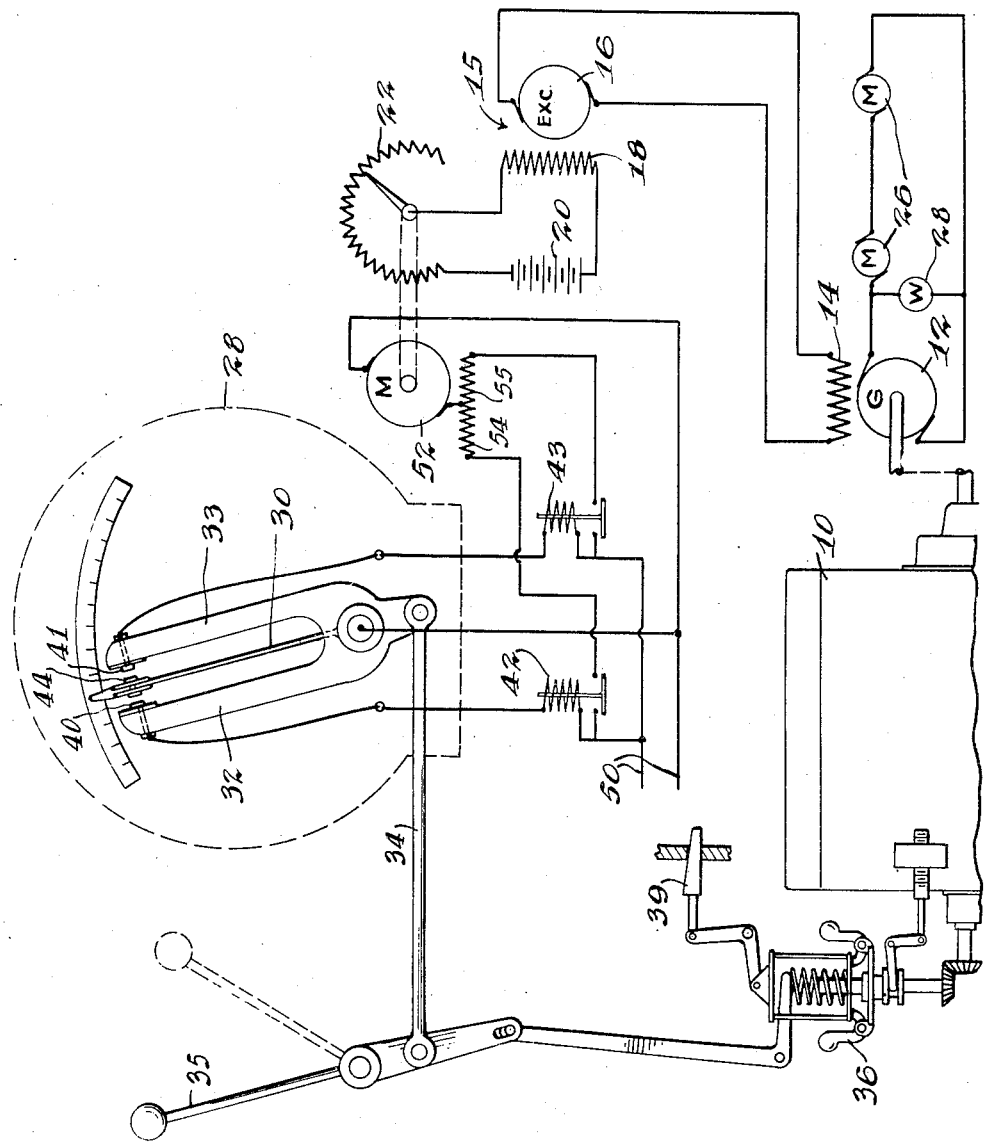
INVENTOR.
WAYNE P. STEPHENS
BY
ATTYS.

Patented Aug. 2, 1949

2,478,135

UNITED STATES PATENT OFFICE 2,478,135

LOCOMOTIVE LOAD CONTROL

Wayne P. Stephens, Springfield, Ohio, assignor to The National Supply Company, Pittsburgh, Pa., a corporation of Pennsylvania Application November 8, 1946, Serial No. 708,608

1 Claim. (Cl. 290—17)

This invention relates to locomotive load control devices and is particularly directed to an apparatus to control the load on an electric generator driven by an internal combustion engine.

In the operation of Diesel-electric locomotives it is necessary to maintain a close correlation between the engine throttle or fuel setting and the load on the traction motors. The "throttle" setting ordinarily is used as an adjustment for the engine governor and thus determines the interim speed of the engine. At any speed the engine can be loaded from no load to full load, but there exists an optimum loading which should not be exceeded if maximum engine efficiency and life are to be had. Further, at any speed, there exists a fairly well defined limit beyond which the engine should not be loaded since overloading causes a very rapid deterioration of the engine parts.

It will thus be apparent that the power available from the engine increases, in the working range, substantially linearly with increased speed, and for any setting of the governor there is a definite maximum load for the traction motors. If the train requirements are such that the available power at a given setting is insufficient, the governor must be adjusted to increase engine speed. If the train requirements are such that the available power is not needed the engine speed should be cut back if efficient operation is to be maintained.

The necessary adjustments can be made manually by a careful operator given the necessary data, but it is desirable that they be made automatically to relieve the operator and to insure that they will be made promptly and properly. Various expedients have been proposed for the purpose of maintaining a safe limit of operation for the engine, most of them based on some variation in the windings of the electrical apparatus involved, coupled with controls initiated from the engine governor, it being taken as a basic premise that engine speed rises as the load on the engine is reduced while the engine slows down with an increase in load. The prior devices have frequently, through some automatically operated means, changed the excitation of the main generator in accordance with governor position, assuming that this is an accurate reflection of the locomotive load. Such devices are accurate only for a predetermined empirical set of conditions of temperature, engine repair, rate of load change and similar factors. Further, all of the instrumentalities most successfully applied at this time require specially wound generators and exciters, thus increasing considerably the cost of a power unit over one equipped with standard wound machines.

It is the primary object of the present invention to provide a locomotive load control which is simple and efficient in operation and by which standard wound generators and exciters can be used.

Another object of the invention is to provide a device in which an available power value is established at each adjusted running speed of the engine and the traction motor load is made substantially equal to the established value.

Another object of the invention is to provide a locomotive load control in which generator excitation is directly controlled in accordance with the load on the traction motors, modified by throttle or governor position.

Other objects and advantages of the invention will become apparent from the following specification, reference being had to the accompanying drawings which shows diagrammatically a load control device constructed in accordance with the present invention.

Referring to the drawings, one form of the device is shown in connection with a locomotive drive comprising an internal combustion engine 10, usually operated on a Diesel cycle, coupled to an electric generator 12. Generator 12 has its field 14 supplied by an exciter 15 comprising an armature 16 and shunt field 18. Voltage for the exciter field is supplied from any suitable source 20 and is adjusted by a variable resistor 22 in series with the field and its source.

Traction motors 26 are supplied from the main generator 12 and the usual switching arrangements for series or parallel operation of the motors may be provided. A power measuring or power responsive device such as a wattmeter 28 is connected in the motor circuit adjacent the generator so that the position of its indicating hand 30 reflects the total power drawn by the traction motors. Ordinarily the wattmeter hand 30 is free to move over its entire scale in response to a change in power in the motor circuit, but in the present instance the hand is confined between opposing contact arms 32, 33 pivotally mounted on the same axis as hand 30.

Arms 32, 33 thus comprise a pivoted yoke which may be moved to an adjusted position by a link 34 connected to a throttle handle 35. Handle 35 is also connected to a governor 36 which controls the speed of the engine 10 in a known manner, as by changing the position of a fuel wedge 39, or if a common rack controlled pump is used, by altering the position of the rack to cause the introduction of more or less fuel as may be needed to maintain constant engine speed under variations in load. The governor connections and operation form no part of the present invention and hence are shown only diagrammatically.

Contacts 40 and 41 are carried at the ends of arms 32, 33 and each contact is in series with a respective relay field 42, 43. A contact 44 carried by the wattmeter hand cooperates with arm contacts 40, 41 and is adapted to close a circuit through either relay field by abutting either of the arm contacts. Power for relay actuation is taken from any suitable source 50.

A servo motor 52, which may conveniently be a split field series wound unit, is also actuated by power from source 50. The motor fields are indicated at 54 and 55 and each is controlled by the armature of a respective one of the relays 42, 43. The rotating element of motor 52 is mechanically connected to variable resistor 22 in the exciter field circuit. It will thus be seen that servo motor 52 will rotate in one direction when its field circuit is closed through relay 42 and in the opposite direction when relay 43 closes. Relay 42 will be closed whenever wattmeter hand contact 44 abuts movable contact 40, and relay 43 will be closed whenever wattmeter hand contact 44 is against movable contact 41.

The operation of the device is as follows: with internal combustion engine 10 in operation, generator 12 will transform the mechanical power of the engine to electrical energy at a voltage determined by the speed of the engine and the degree of excitation imparted to its field from exciter 15. The speed of the engine is determined by the position of throttle handle 35 and for any speed the load on the engine may be varied from no load to a definite maximum which should not be exceeded. Thus, a given position of throttle handle 35 represents a definite value of available power that should be taken from the engine, transformed by the generator 12 and utilized in the traction motors 26. Similarly for each position of the throttle handle 35 there is a corresponding position of contact arms 32, 33 since these arms are connected to the throttle handle by link 34 and follow its movements.

Wattmeter 28 measures the power consumed by the traction motors 26 so that its hand 30 tends to stand in a definite position for any motor load. The hand, however, is confined between the contact arms 32, 33 and unless the motor load corresponds to the setting of the contact arms the hand carried contact 44 will be against one or the other of the arm contacts 40, 41. If the motor load is correct for the mechanical setting of the contact arms, the circuits of which contacts 44, 40 and 41 are a part will be open. Closure of the relay circuits which include these contacts causes the excitation of generator 12 to be changed by rotation of the servo motor 52 and alteration of the exciter field by resistor 22. Thus, when the wattmeter hand tends to move beyond or to lead the set position of contact arms 32, 33, it is an indication that the traction motors are drawing more power than should be available at that setting of the throttle handle and the excitation to the main generator 12 is reduced by reducing its excitation. If the hand of the wattmeter lags the position of the contact arms, the traction motors are then not using all of the power that is efficiently available at the particular throttle setting, so that the generator field is increased by increased excitation, thus furnishing more power to the traction motors.

The above changes in generator field causing as they do an increase or decrease in power to the traction motors, reflect themselves in changes in train speed. If the operator finds his train speed increasing, it means that for his particular interim throttle setting more power is efficiently available than is being consumed by the traction motors. If the increase in speed is not desirable, the operator must reset the throttle handle 35 to a position such that the engine power coincides with the motor demand.

It will be apparent that each setting of the throttle handle representing as it does a definite "efficiently available power," will also maintain a constant load on the engine and generator regardless of changes in draw bar pull. If the draw bar pull increases at a time when the engine is fully loaded at its speed setting, the current to the traction motors 26 increases which increases the load on the generator and engine. The wattmeter hand contact 44 then abuts arm contact 41 closing the circuit through field 55 of servo motor 52 which rotates resistor 22 in a direction to decrease the generator excitation and hence its voltage output. The train will then slow down unless the operator increases the engine speed.

One of the prism factors that has led to design complications in the past has been operational variation of the electrical components with variations in temperature. It will be seen that if the parts are all at low temperature, the current flow through exciter field 18 will increase for a given potential since its resistance is less than at high temperature. Thus the output voltage of the exciter is increased. However, at the same time the temperature of the field of main generator 12 is low so the exciter voltage can pass more than normal current through this winding. The generator output voltage is thus additionally raised. Since the effect of low temperature thus multiplies itself there can be as much as 80 to 100 horsepower difference in engine load for the same setting of an exciter control rheostat. The present invention, being controlled by the ultimate factor of interest, i. e. the traction motor load, is entirely independent of temperature of any of the parts.

It will thus be seen that I have provided a simple and efficient load control apparatus capable of regulating within very close limits the loading of a locomotive engine. While the device has been described in connection with a specific form and disposition of the parts it should be expressly understood that it is capable of numerous modifications and changes without departing from the scope of the appended claim.

What I claim is:

A load control for a locomotive having an internal combustion engine, a speed responsive governor therefor, an electric generator driven by said engine and traction motors driven by said generator, said load control including, means to adjust said engine governor, a pair of facing contacts mounted for pivoted movements in response to an adjusting movement imparted to said governor, power responsive means associated with said traction motors and having a pivoted contactor disposed between said facing contaacts, an exciter for said generator, means to adjust the output of said exciter driven in one direction or the other in response to a circuit closed by said pivoted contactor through one or the other of said facing contacts, whereby the generator excitation is changed and the power drawn by said traction motors from said generator is substantially equal to the available power from said engine at its adjusted running speed.

WAYNE P. STEPHENS.

REFERENCES CITED

The following references are of record in the file of this patent:

UNITED STATES PATENTS

| Number | Name | Date |
|---|---|---|
| 1,799,096 | Goernsey | Mar. 31, 1931 |
| 1,821,827 | Brandenstein | Sept. 1, 1931 |
| 1,843,730 | Pestarini | Feb. 2, 1932 |
| 1,945,447 | Pestarini | Jan. 30, 1934 |
| 2,060,900 | Simmen | Nov. 17, 1936 |
| 2,078,362 | Arendt | Apr. 27, 1937 |
| 2,098,177 | Buchold | Nov. 2, 1937 |
| 2,424,121 | Schlapfer | July 15, 1947 |

FOREIGN PATENTS

| Number | Country | Date |
|---|---|---|
| 534,034 | Germany | Sept. 21, 1931 |

Certificate of Correction

Patent No. 2,478,135                                                            August 2, 1949

WAYNE P. STEPHENS

It is hereby certified that error appears in the printed specification of the above numbered patent requiring correction as follows:

Column 4, line 29, for the word "prism" read *prime*;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*